Nov. 16, 1965　　　　　W. A. ROSS　　　　　3,217,822
HYDRAULIC DIFFERENTIAL SPEED STEERING SYSTEM
Filed Oct. 23, 1963
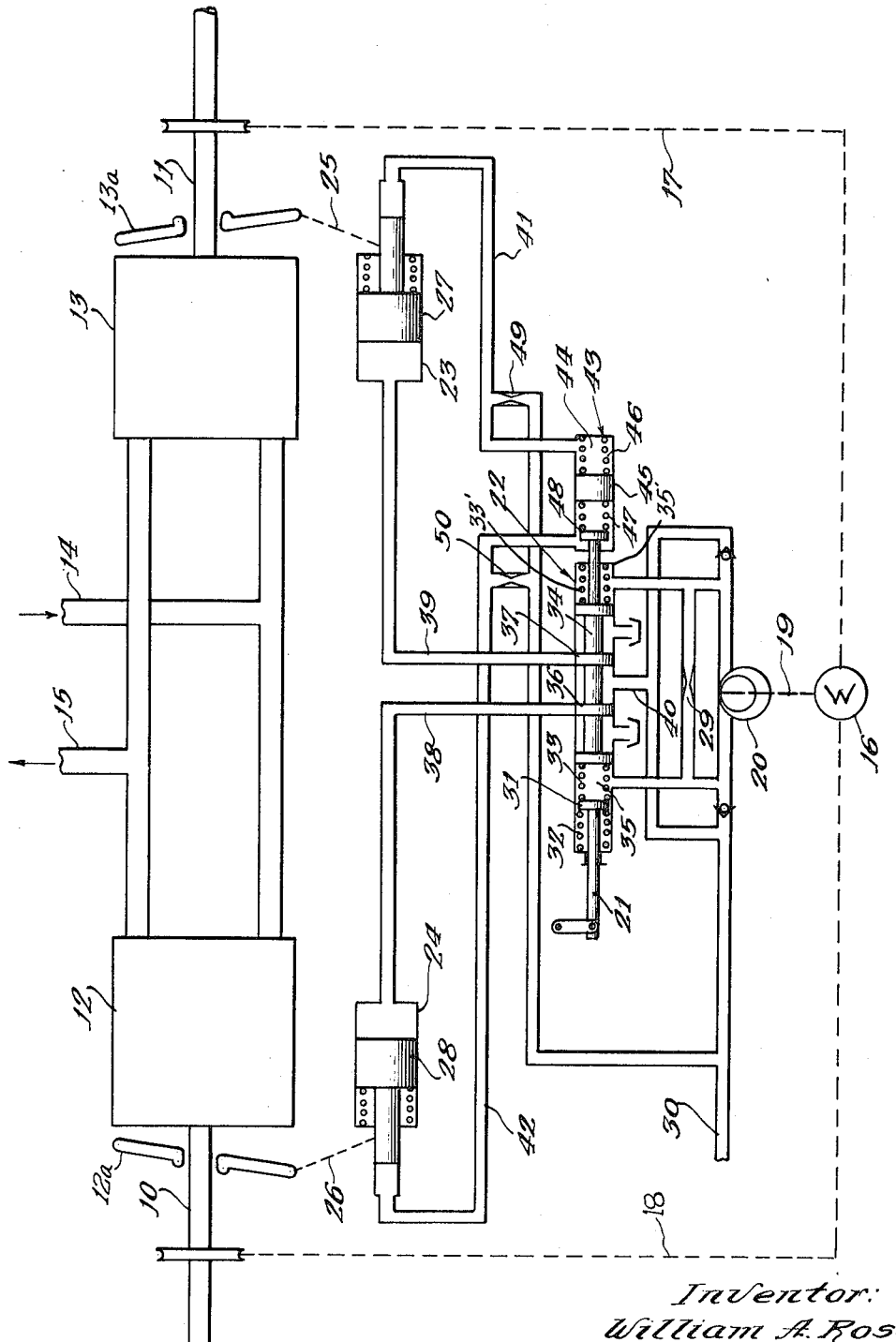
Inventor:
William A. Ross
By: Hofgren, Brady, Wegner,
Allen & Stellman
Attorneys

United States Patent Office 3,217,822
Patented Nov. 16, 1965

3,217,822
HYDRAULIC DIFFERENTIAL SPEED STEERING SYSTEM
William A. Ross, Rockford, Ill., assignor to Sundstrand Corporation, a corporation of Illinois
Filed Oct. 23, 1963, Ser. No. 332,319
15 Claims. (Cl. 180—6.48)

This application is a continuation-in-part of my copending application Serial No. 180,519, filed March 19, 1962, now abandoned.

The present invention relates to vehicle power systems and more particularly to a new and improved steering system.

It is a general object of the invention to provide a new and improved steering system for a hydraulic vehicle transmission.

Certain vehicles, such as tanks and tractors, utilize separate hydraulic motors for driving right and left propelling tracks or wheel functioning in a similar manner, and it is desirable in order to make a turn for steering the vehicle to have the motors driven at different speeds dependent upon the position of a driver's steering control and independent of the output loads. Also, during a turn, the wheel or track traveling the shorter distance should not unnecessarily dissipate energy through skidding or through losses within the power train.

It is therefore an object of the present invention to provide a differential speed steering system which combines the input from the driver's steering control and the difference in speed of the two motors to generate a signal which will automatically furnish the proper driving torques and speeds from the hydraulic outputs.

Another object of the invention is to provide a hydraulic system including a gear-type differential having an output responsive to the difference between the speeds of the two hydraulic motors, a fixed displacement pump to convert said output to a hydraulic signal, and a fluid control system utilizing said hydraulic signal in opposition to the manual signal from the driver for stabilizing the speeds of the hydraulic motors when the relative difference dictated by the driver's control has been obtained.

Other objects and advantages will become readily apparent from the following detailed description taken in connection with the accompanying drawing, in which:

The figure is a diagrammatic illustration of a differential speed steering system embodying the principles of the present invention.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Referring now to the drawing, two output shafts 10 and 11 are shown, driven respectively by variable capacity hydraulic motors 12 and 13. The shafts are adapted for connection respectively to the right and left propelling tracks or the like of a vehicle intended to be steered by varying the speed of one motor relative to the other. The variable capacity motors 12 and 13 are driven by hydraulic fluid under pressure supplied from a suitable hydraulic source as through a conduit 14, and hydraulic fluid is returned to said source as through a conduit 15. The hydraulic source may be a pump or pumps as is well known in the art and fluid may be supplied through conduit 15 and returned through conduit 14. Motors 12 and 13 may be of a well known axial piston type and each includes a variable angle swashplate as at 12a and 13a movable in opposite directions from neutral in a conventional manner for varying displacement and hence torque, thereby to vary speed.

A gear-type differential 16 of a conventional type acts as a speed summer and for this purpose is mechanically connected to output shafts 10 and 11 as illustrated schematically by broken lines 17 and 18. The individual output shafts 10 and 11 drive separate inputs to the differential 16 and are compared by the differential, and any difference in these outputs will be delivered by the differential output 19 in a direction and at a speed representative of the difference between the speeds of the outputs 10 and 11. As examples, U. S. Patent 2,336,911 of December 14, 1943 and U.S. Patent 2,771,791 of November 27, 1956, illustrate differentials suitable for use at 16. Separate differential inputs would be driven in opposite directions by motor shafts 10 and 11, and the output would rotate at a speed and in a direction indicative of the difference in speeds at 10 and 11. The output 19 is connected to drive a fixed displacement pump 20, the flow from which is directed in one direction or the other, depending upon the direction in which the pump is driven, toward an orifice 29 causing a pressure drop which is a function of the speed difference. The pump 20 and orifice 29 therefore sense speed, determining the difference in speed of outputs 11 and 12 and the direction of the difference, and convert the mechanical signal of the difference to a hydraulic signal, which is presented to a control valve system shown generally at 22.

A further control signal input is indicated at 21 in the form of a mechanical connection from a driver's manually accessible and manually operable steering control. The two inputs, the output difference signal from pump 20 and the signal from the driver's steering control 21, are combined, that is, compared, by the hydraulic system shown generally at 22 to position motor displacement varying means herein disclosed as control pistons and cylinders 23 and 24 in a manner which will be described more fully presently. The control pistons and cylinders through suitable mechanical linkages as represented by broken lines 25 and 26, respectively, vary the displacement of the motors 12 and 13, and thus vary the torque and speed of output shafts 11 and 10 to provide the proper output speeds.

It will be understood that when the swashplates 12a and 13a are positioned at comparable angles, the displacement in the two motors will be substantially identical and if the resistances encountered by the motors are substantially equal the output speeds for the motors will be substantially identical so that the vehicle tracks in a substantially straight line in a direction and at a speed controlled by the delivery of fluid under pressure through the conduit 14 or 15 to the motors. On the other hand, if the swashplates are varied relative to each other, the displacements and the speeds of the motors 12 and 13 may be varied relative to each other. For example, if the motor 12 represents a left-hand driving motor and the motor 13 a right-hand drive, if the speed of the motor 13 is reduced and/or the speed of the motor 12 is increased, this will effect a steering action to turn the vehicle to the right as it travels forwardly.

Under many circumstances it will be found that the resistance to motion of a tracked vehicle varies widely and in a random fashion at each motor and in each motor relative to the other, both while traveling in a straight path and while turning. Speed of the vehicle in overcoming the resistance to motion is dependent primarily on the torgue developed at the motors. Further, in a tracked vehicle utilizing a substantial length of relatively flat track engaging the ground at each side of the vehicle, turning of the vehicle requires a twisting motion of the vehicle, about its center, for example, involving a lateral sliding of substantial portions of the track on the ground, and depends largely on the relative torques developed at the two tracks for producing speed differences for turning. Thus, in order to turn, the outside track requires greater torque and the inside track lesser torque or even negative torque, the latter involving movement of the swashplate overcenter.

In order to control the motors 12 and 13 under all circumstances, a source of control fluid under pressure is utilized as at 30 to feed the hydraulic system shown generally at 22. The control system includes a mechanical connection of the driver's manual control 21 to a plunger 31 which is urged to a predetermined neutral center position as by springs 32 and 33 acting against opposite sides of the plunger. As the steering control 21 is moved toward the right, for example, the plunger 31 is also moved to the right and compresses spring 33 which acts against a spool valve 34 which is normally urged to a neutral center position by opposed springs at at 33 and 33' acting against opposite ends of the valve member. With the valve member 34 in the neutral center position illustrated, annular valve portions or lands 36 and 37 block fluid lines 38 and 39 leading to the piston and cylinder devices 23 and 24, thereby to stabilize the displacement varying means against operation. Valve member 34 is movable in opposite directions from the neutral center position illustrated for purposes of controlling flow of fluid to and from the lines 38 and 39 thereby to vary the displacement of the motors in a manner dictated by movement of the steering control 21. Movement of the control 21 to the right as described effects movement of the valve 34 to the right so that the passage 39 communicates with the source 30 through a passage 40, and the passage 38 is connected to drain. Control piston 27 thus move to the right, increasing the displacement of the right motor 13 and increasing its torque to increase speed while control piston 28 moves to the right, decreasing the displacement of the left motor 12, decreasing its torque, and ultimately imposing a negative torque if necessary, as a result of which the vehicle turns to the left.

The differential speeds thus created at the output shafts 10 and 11 thereby provide an output from the differential 16 to drive the pump 20 in a direction to supply fluid under pressure to the valve 34 as a feedback signal in opposition to the manual signal provided at 21, the pump 20 delivering to the right as viewed in the drawing, for example, to supply pressure to valve chamber 35' with relatively lower pressure across orifice 29 in chamber 35. So long as the force of fluid delivered by pump 20 in opposition to the manual signal 21 is less than the manual signal 21, the valve remains open, adjusting the displacement of the motors. As the difference in the speeds of the outputs 10 and 11 increases to the value dictated by movement of the manual control 21, the strength of the signal from the pump 20 increases ultimately to a value sufficient to close the valve in opposition to the manual signal, thereby holding the relative motor displacements at values satisfactory for the desired turn. The valve is thereby neutralized, with the manual control 21 at a position displaced from its neutral center position. Thus, when the driver desires to return to straight tracking, he has merely to return the manual control 21 to the neutral center position. This enables movement of the valve 34 toward the left from the position illustrated causing an increase in displacement of the motor 12, while displacement of the motor 13 is decreased, thereby eliminating the left turn. As the speed difference decreases, the force of fluid from the pump 20 decreases allowing the valve 34 to return to the neutral center position when the motors 12 and 13 attain similar speeds.

During the turning as described above, variation in resistances to motion at the motors is reflected in variations in speed which are sensed and automatically compensated for, thereby to maintain the predetermined difference speed called for by the operator. For example, if resistance at motor 13 increases, its speed decreases, and flow from pump 20 decreases, so that valve land 37 opens passage 39 to passage 30 to increase displacement of motor 13. If resistance increases at motor 12 its displacement is increased.

The speed differential sensing means and the valve 34 will also operate to automatically maintain the vehicle in a straight path with the manual control 21 in the neutral center position if there arises a tendency of the vehicle to turn when this is not desired. The control operates to compensate for varying resistances to motion at the motors and to compensate for varying efficiencies. For example, if for some reason, such as variation in efficiency or slippage in the two motors, the speed of one motor, the left motor 12, for example, exceeds the speed of the other motor more than the difference speed called for, pump 20 will be driven in a manner to move the valve 34 toward the right from the neutral center position to effect adjustment of the swashplates 12a and 13a to positions which will return the motors to similar speeds.

The control system also includes a damping mechanism in the form of a dashpot identified generally at 43 and including a cylinder 44, a piston 45 therein, opposed centering springs 46 and 47, and a plunger 48 which operate in conjunction with orifices at 49 and 50. The dashpot operates as a compensating means so that as spool 34 is moved to the right, allowing fluid to flow from conduit 40 through line 39 to move piston 27, plunger 48 is also moved to the right by virtue of its connection with spool valve 34 and through spring 47 moves piston 45 to the right also. By this operation back pressure is created against fluid flowing in line 41 and the control piston 27 cannot be overdriven to provide excess control on the hydraulic motor 13. Hunting of the control system is thereby prevented. The pressure in line 41 will ultimately slowly bleed through orifice 49 and pressure in the dashpot will return to normal. Control piston and cylinder 24 is controlled in a similar manner.

While the particular embodiment of the invention shown and described herein utilizes variable displacement motors, obviously similar control principles can be applied to a system wherein the motors are fixed displacement motors and the source of power of operating fluid is supplied from variable displacement pumps to which control may be applied by varying the displacement of the pumps rather than the motors. The control may also be applied to the working fluid intermediate the pump and motor to effect the desired control. Other speed sensor means may be used in lieu of pump 20 and orifice 29, such as a flyweight governor-type sensor.

I claim:

1. A differential speed steering system for a vehicle having driven tracks or the like on either side thereof and a steering control, said system comprising, a first variable displacement hydraulic motor for driving the driven track on one side of the vehicle and a second variable displacement hydraulic motor for driving the driven track on the other side of the vehicle, means driven by said tracks for providing a signal generated by the difference in the speeds of said driven tracks, a source of working fluid under pressure connected to said motors for supplying hydraulic fluid thereto, means for varying the displacement of each of the motors, a source of control fluid under pressure for operating said displacement varying means, a valve controlling said control fluid and movable to direct control fluid selectively to either of said displacement varying means, means connected with said steering control for moving the valve in either direction and means for opposing such movement of the valve responsive to the signal generated by the difference in speed of the driven tracks in feedback fashion to neutralize the effect of the steering control on the valve.

2. A differential speed steering system for a vehicle having driven tracks on either side thereof and a steering control, said system comprising, a first variable displacement hydraulic motor for driving the driven track on one side of the vehicle and a second variable displacement hydraulic motor for driving the driven track on the other side of the vehicle, a source of fluid pressure for operating said motors, means for varying the displacement of each of the motors and control means movable to operate said motor displacement varying means, and means for moving said control means including a mechanically resilient connection between said steering control and said control means for producing a force on said control means, a fixed displacement hydraulic pump, a differential system having inputs operatively connected to the driven tracks and an output connected for operating the pump at a speed proportional to the difference in speed of the driven tracks and in a direction determined by the more rapidly moving track, and means for applying the pressure generated by said pump in opposition to the force transmitted from said steering control in feedback fashion to neutralize the force of the resilient connection.

3. A vehicle power system comprising, a first variable speed hydraulic motor for driving a track on one side of the vehicle and having a piston and cylinder means for varying said first motor speed; a second variable speed hydraulic motor for driving a track on the other side of the vehicle and having a piston and cylinder means for varying said second motor speed; a source of fluid pressure for operating said motors; a source of control fluid pressure; a control valve for said piston and cylinder means having a spool valve member with spaced annular portions operable to control two outlet ports connected respectively to the said piston and cylinder means for varying the motor speeds, a stationary valve chamber for said valve member, means connecting said control fluid pressure to said chamber at a point between said annular valve portions, a vehicle steering control device, a plunger in one end of said chamber connected to said steering device, a spring between said plunger and said valve member and engaging said valve member and said plunger, and a spring between said plunger and the adjacent end of the valve chamber.

4. A vehicle power system comprising, a first variable speed hydraulic motor for driving a track on one side of the vehicle and having a piston and cylinder means for varying said first motor speed; a second variable speed hydraulic motor for driving a track on the other side of the vehicle and having a piston and cylinder means for varying said second motor speed; a source of fluid pressure for operating said motors; a source of control fluid pressure; a control valve for said piston and cylinder means having a spool valve member with spaced annular portions operable to control two outlet ports connected respectively to one end of each of the said piston and cylinder means for varying the motor speeds, a cylindrical valve chamber for said valve member, means connecting said control fluid pressure to said chamber at a point between said annular valve portions, a vehicle steering control device, a plunger in one end of said chamber connected to said steering device, a spring between said plunger and said valve member, a spring between said plunger and the adjacent end of the valve chamber, and means hydraulically connecting the other ends of said piston and cylinder means including a dashpot having a cylinder, a piston therein, a spring between one side of said last-named piston and one end of the cylinder, a plunger in the other end of said cylinder connected to the spool valve member, and a spring positioned between said plunger and the other side of said last-named piston.

5. A vehicle power system, comprising, a first variable speed hydraulic motor for driving a track on one side of the vehicle and having a piston and cylinder means for varying said first motor speed, a second variable speed hydraulic motor for driving a track on the other side of the vehicle and having a piston and cylinder means for varying said second motor speed; a source of fluid pressure for operating said motors; a source of control fluid pressure; a control valve for said piston and cylinder means having a spool valve member with spaced annular portions operable to control two outlet ports connected respectively to the said piston and cylinder means for varying the motor speeds, a cylindrical valve chamber for said valve member, means connecting said control fluid pressure to said chamber at a point between said annular valve portions, a vehicle steering control device, a plunger in one end of said chamber connected to said steering device, a spring between said plunger and said valve member, a spring between said plunger and the adjacent end of the valve chamber, a spring between said valve member and the opposite end of the valve chamber, and means operable in opposition to manual operation of the valve member for returning the latter to closed position following manual operation thereof including a differential having inputs connected to said hydraulic motor outputs and an output proportionate in direction and speed to the difference in the speeds of the hydraulic motor outputs and a fixed displacement pump driven by said differential output for delivering a hydraulic signal to the valve chamber in opposition to the signal produced on manual operation of the valve member.

6. A steering system for a vehicle having driven tracks at opposite sides thereof movable at different speeds for purposes of steering, comprising, a pair of variable speed hydraulic motors adapted for connection respectively for driving the tracks, separate means respectively connected for varying the speed of the motors, a manually operable steering control movable in opposite directions from a neutral center position for generating a signal for steering the vehicle in opposite directions, control means responsive to said steering signal for operating said speed varying means to vary the relative speeds of the motors as dictated by movement of the steering control, means connected to the output of said motors for generating a signal indicative of the difference in rotative speeds of the motors, and means for delivering said speed signal to said control means in opposition to said steering signal for neutralizing the control means when the dictated relative speeds are obtained.

7. A steering system for a vehicle having propelling tracks at opposite sides thereof movable at different speeds for purposes of steering, comprising, a pair of drive shafts respectively at opposite sides of the vehicle for connection respectively with the vehicle tracks, a pair of variable displacement hydraulic motors respectively connected for driving the drive shafts, separate fluid operated means respectively connected for varying the displacement of the motors and thereby varying the speed of the motors, a manually operable steering control movable in opposite directions from a neutral center position for steering the vehicle in opposite directions, control valve means yieldably connected to said steering control for operating said displacement varying means to vary the relative speeds of the motors as dictated by movement of the steering control, a differential having inputs driven by the drive shafts and an output rotatable in a direction and at a speed indicative of the difference in speeds of the drive shafts, and pump means driven by the differential output and connected for delivering fluid to said valve means in opposition to said manually operable steering control for neutralizing the control valve means when the dictated relative speeds are obtained.

8. A steering system for a vehicle having propelling tracks at opposite sides thereof movable at different speeds for purposes of steering, comprising, a pair of drive shafts respectively at opposite sides of the vehicle for connection respectively with the vehicle tracks, a pair of variable displacement hydraulic motors respectively connected for driving the drive shafts, separate fluid operated piston and cylinder means respectively connected for varying the displacement of the motors and thereby varying the speed of the motors, a manually operable steering control movable in opposite directions from a neutral center position for steering the vehicle in opposite directions, control valve means yieldably connected to said steering control for operating said displacement varying means to vary the relative speeds of the motors as dictated by movement of the steering control, means operated by the drive shafts for generating a signal indicative of the difference in speeds of the drive shafts and delivering such signal to said control valve means in opposition to said steering control for neutralizing the control means when the dictated relative speeds are obtained, and fluid means operated in response to movement of the control valve means for damping movement of the piston and cylinder means to prevent overrun of the displacement varying means beyond the positions dictated by movement of the steering control.

9. A steering system for a vehicle having propelling tracks at opposite sides thereof movable at different speeds for purposes of steering, comprising, a pair of drive shafts respectively at opposite sides of the vehicle for connection respectively with the vehicle tracks, a pair of variable displacement hydraulic motors respectively connected for driving the drive shafts, separate fluid operated means respectively connected for varying the displacement of the motors and thereby varying the speed of the motors, a manually operable steering control movable in opposite directions from a neutral center position for steering the vehicle in opposite directions, a control valve having a neutral center position blocking the flow of control fluid to and from said fluid operated means thereby to stabilize the latter and movable in opposite directions from the neutral center position respectively for controlling the flow of fluid to and from the fluid operated means thereby to vary the relative speeds of the motors, means yieldably connecting the control valve to the manually operable steering control so that the latter follows the former, a differential having inputs driven by the drive shafts and an output rotatable in a direction and at a speed indicative of the difference in speeds of the drive shafts, reversible pump means driven by the differential output, and passage means for delivering fluid from the pump means directly to either end of the valve in opposition to said manually operable steering control and across a restrictive orifice to the other end of the valve for neutralizing the valve when the dictated relative speeds are obtained.

10. A steering system for a vehicle having driven tracks at opposite sides thereof movable at different speeds for purposes of steering, comprising, a pair of variable speed hydraulic motors adapted for connection respectively for driving the tracks, separate means respectively connected for varying the speeds of the motors, a manually operable steering control movable between extreme positions in opposite directions from a neutral center position for generating a signal for steering the vehicle in a straight path and to opposite sides of said path, control means responsive to said steering signal for operating said speed varying means to vary the relative speeds of the motors as dictated by movement of the steering control, means driven by the output of said motors for generating a signal indicative of the difference in rotative speeds of the motors with the steering control in the neutral center position, and means for delivering said speed signal to said control means to operate the latter to equate the two motor speeds to correspond to the neutral center position of the steering control.

11. A steering system for a vehicle having propelling tracks at opposite sides thereof movable at different speeds for purposes of steering, comprising, a pair of variable displacement hydraulic motors adapted for connection respectively for driving the tracks, separate fluid operated means respectively connected for varying the displacement of the motors and thereby varying the speed of the motors, a manually operable steering control movable in opposite directions from a neutral center position for steering the vehicle in a straight path and to opposite sides of the path, control valve means yieldably connected to said steering control for operating said displacement varying means to vary the relative speeds of the motors as dictated by movement of the steering control, and pump means driven by the motors in a direction and at a speed proportionate to the difference in speeds of the motors when the steering control is in the neutral center position for delivering fluid to said valve means for operating the latter to equate the motor speeds thereby to drive the vehicle in a straight path conforming to the position of the steering control.

12. A steering system for a vehicle having propelling means at opposite sides thereof movable at similar or different speeds for purposes of steering, comprising, a pair of variable displacement hydraulic motors adapted for connection respectively for driving the propelling means, separate fluid operated means respectively connected for varying the displacement of the motors thereby to vary the torques and speeds of the motors, a manually operable steering handle movable in opposite directions from a neutral center position for steering the vehicle in a predetermined path, means providing a source of control fluid under pressure, valve means yieldably connected to said steering handle for controlling the flow of control fluid relative to said displacement varying means to vary the relative torques of the motors to propel the vehicle in a predetermined path as dictated by movement of the steering handle, means connected to the output of said motors for sensing the speeds of the motors and generating a signal indicative of a departure of the difference in rotative speeds of the motors from the difference called for by the steering handle, and means for delivering said departure signal to said valve means for operating the latter to adjust the displacement varying means to correct for the departure.

13. A steering system for a vehicle having propelling means at opposite sides thereof movable at similar or different speeds for purposes of steering, comprising, a pair of variable displacement hydraulic motors adapted for connection respectively for driving the propelling means, separate fluid operated means respectively connected for varying the displacement of the motors thereby to vary the torques and speeds of the motors, a manually operable steering handle positionable in a neutral center position for steering in a straight path and movable in opposite directions therefrom for turning the vehicle, means providing a source of control fluid under pressure, valve means positionable in a neutral center position to stabilize the displacement varying means and movable in opposite directions from the neutral center position respectively to control the flow of control fluid relative to the displacement varying means to increase the torque of the motor driving the propelling means on the outside of the turn and decrease the torque of the other motor, means yieldably connecting the handle with the valve means for movement of the latter with the handle and relative thereto, means connected to the output of said motors for generating a signal indicative of a departure of the speeds of the motors from the speeds called for by the steering handle, and means for delivering said departure signal to said valve means for operating the latter to increase the displacement of the motor which is slow relative to the speed called for and decrease the displacement of the motor which is fast relative to the speed called for.

14. A steering system for a vehicle having propelling means at opposite sides thereof movable at similar or different speeds for purposes of steering, comprising, a pair of variable displacement hydraulic motors adapted for connection respectively for driving the propelling means, separate fluid operated means respectively connected for varying the displacement of the motors thereby to vary the torques and speeds of the motors, a manually operable steering handle positionable in a neutral center position for steering in a straight path and movable in opposite directions therefrom for turning the vehicle, means providing a source of control fluid under pressure, valve means positionable in a neutral center position to stabilize the displacement varying means and movable in opposite directions from the neutral center position respectively to control the flow of control fluid relative to the displacement varying means to increase the torque of the motor driving the propelling means on the outside of the turn and decrease the torque of the other motor, means yieldably connecting the handle with the valve means for movement of the latter with the handle and relative thereto, means operatively associated with the motors for generating a signal indicative of a difference in rotative speeds of the motors, and the direction of the difference, when the steering handle is in the neutral center position, and means for delivering said difference signal to said valve means for operating the latter to increase the displacement of the relatively slow motor and decrease the displacement of the relatively fast motor, said generating means being operative when the handle and valve are moved from neutral positions to generate a feedback signal indicative of the difference in rotative speeds of the motors called for by the steering handle when such difference is attained, and said delivering means delivering said feedback signal to said valve means for moving the latter to neutral position for stabilizing the displacement varying means when the difference called for is attained.

15. A steering system for a vehicle having driven tracks at opposite sides thereof movable at different speeds for the purposes of steering, comprising, a pair of hydraulic motors adapted for connection respectively for driving the tracks, means for varying the relative speeds of the hydraulic motors, control means movable in opposite directions connected to said speed varying means to vary the relative speeds of the hydraulic motors, a steering control for moving said control means to steer the vehicle, feedback means connected to the output of said motors for generating a signal indicative of the difference in rotative speeds of the motor, and means for delivering said feedback signal to the control means in opposition to said steering control to neutralize the control means when the desired relative speeds of the motors are obtained.

References Cited by the Examiner
UNITED STATES PATENTS

| | | | |
|---|---|---|---|
| 2,336,911 | 12/1943 | Zimmermann | 74—687 |
| 2,941,609 | 6/1960 | Bowers | 180—6.48 |
| 3,025,722 | 3/1962 | Eger et al. | 74—711 |

FOREIGN PATENTS

| | | |
|---|---|---|
| 876,140 | 8/1961 | Great Britain. |
| 137,017 | 3/1961 | Russia. |

A. HARRY LEVY, *Primary Examiner.*

PHILIP ARNOLD, *Examiner.*